US009142011B2

(12) United States Patent
Fan et al.

(10) Patent No.: US 9,142,011 B2
(45) Date of Patent: Sep. 22, 2015

(54) SHADOW DETECTION METHOD AND DEVICE (71) Applicants: Shengyin Fan, Beijing (CN); Xin Wang, Beijing (CN); Qian Wang, Beijing (CN); Gang Qiao, Beijing (CN)

(72) Inventors: Shengyin Fan, Beijing (CN); Xin Wang, Beijing (CN); Qian Wang, Beijing (CN); Gang Qiao, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/276,053

(22) Filed: May 13, 2014

(65) Prior Publication Data

US 2014/0341464 A1   Nov. 20, 2014

(30) Foreign Application Priority Data

May 15, 2013   (CN) .......................... 2013 1 0178434

(51) Int. Cl.
*G06T 5/00*   (2006.01)
*G06T 7/00*   (2006.01)

(52) U.S. Cl.
CPC ............... *G06T 5/008* (2013.01); *G06T 7/0081* (2013.01); *G06T 2200/04* (2013.01); *G06T 2207/10012* (2013.01); *G06T 2207/10024* (2013.01); *G06T 2207/20144* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| 5,592,567 | A  | * | 1/1997  | Kilger ........................... 382/199 |
| 7,133,083 | B2 |   | 11/2006 | Jaynes et al. |
| 8,294,794 | B2 | * | 10/2012 | Zhang et al. .................. 348/251 |
| 2010/0111362 | A1 | * | 5/2010  | Huang et al. .................. 382/103 |
| 2013/0071016 | A1 | * | 3/2013  | Omer et al. ................... 382/164 |
| 2014/0160155 | A1 | * | 6/2014  | Berkovich et al. ............. 345/629 |
| 2014/0240477 | A1 | * | 8/2014  | Feng et al. ....................... 348/77 |

OTHER PUBLICATIONS

Pei et al, "Moving Cast Shadow Detection Based on PCA," 2009, Fifth International Conference on Natural Computation, pp. 581-584.*

* cited by examiner

*Primary Examiner* — Bhavesh Mehta
*Assistant Examiner* — David F Dunphy
(74) *Attorney, Agent, or Firm* — Oblon, McClelland, Maier & Neustadt, L.L.P.

(57) ABSTRACT

Disclosed are a shadow detection method and device. The method includes a step of obtaining a depth/disparity map and color/grayscale image from a two-lens camera or stereo camera; a step of detecting and acquiring plural foreground points; a step of projecting the acquired plural foreground points into a 3-dimensional coordinate system; a step of carrying out, in the 3-dimensional coordinate system, a clustering process with respect to the projected plural foreground points so as to divide the projected plural foreground points into one or more point clouds; a step of calculating density distribution of each of the one or more point clouds by adopting a principal component analysis algorithm so as to obtain one or more principal component values of the corresponding point cloud; and a step of determining, based on the one or more principal component values, whether the corresponding point cloud is a shadow.

10 Claims, 9 Drawing Sheets

THREE PRINCIPAL COMPONENTS
AFTER CARRYING OUT PCA

FIG.1A

SHADOW IN
GRAYSCALE IMAGE

FIG.1B

SHADOW IN
DEPTH MAP

GRAYSCALE IMAGE          DEPTH MAP

FOREGROUND POINTS IN IMAGE COORDINATE SYSTEM

FOREGROUND POINTS IN
3-DIMENSIONAL COORDINATE SYSTEM

FIG.9

SHADOW DETECTION METHOD AND DEVICE

BACKGROUND OF THE INVENTION

1. Field of the Invention

The present invention generally relates to a shadow detection method and device, and more particularly relates to a method and device for detecting and removing shadow by utilizing a color image/grayscale image and depth map/disparity map captured by a two-lens camera or stereo camera.

2. Description of the Related Art

Figure 1A:
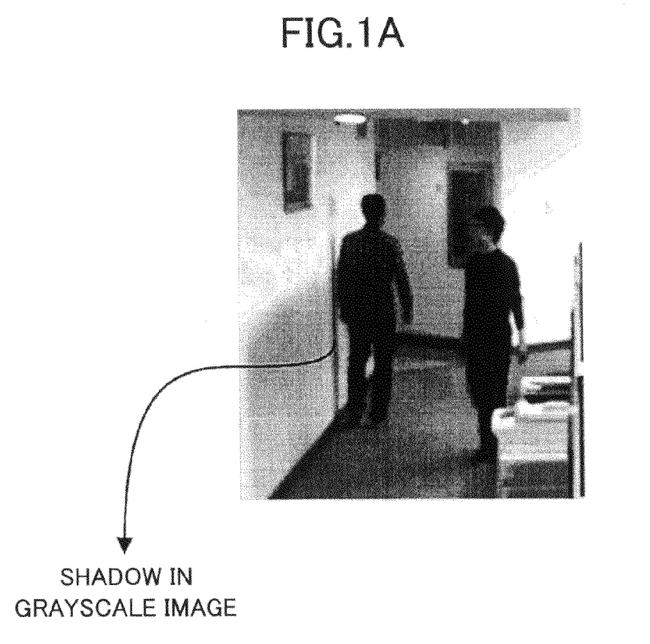
FIG. 1A illustrates a grayscale image including shadow, captured by a two-lens camera or stereo camera.
Figure 1B:
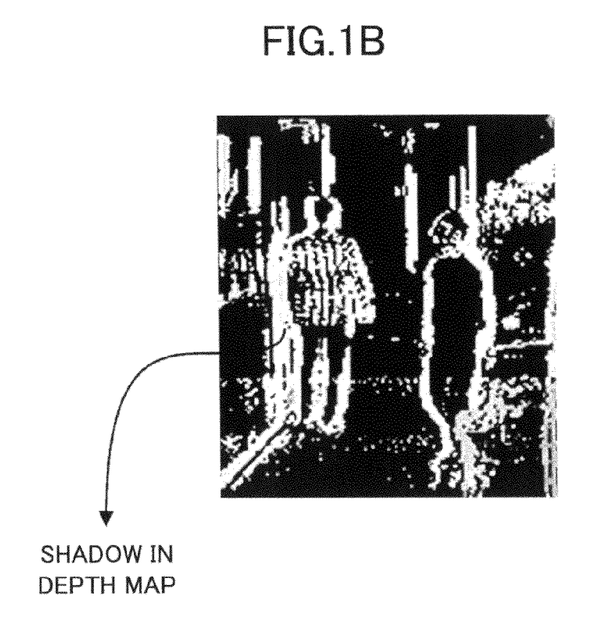
FIG. 1B illustrates a depth map including shadow, captured by a two-lens camera or stereo camera.

Shadow is a kind of familiar natural phenomenon, and often exists in a color image or grayscale image captured by a well-used camera. FIGS. 1A and 1B illustrate that shadow exists in a grayscale image and depth image captured by a two-lens camera, respectively. The existence of shadow brings a lot of difficulties and restrictions to computer-based image processing. In particular, in object detection performed on an image, the existence of shadow may negatively influence the accuracy of the object detection. For example, a segmentation method is easily influenced by shadow, thereby generating a segmentation error. In addition, an object detection algorithm or object tracking algorithm is also easily influenced by shadow, thereby generating an incorrect detection result or incorrect tracking result. As a result, a shadow detection and removal technique used for a video or single-frame image has attracted attention.

Well-used shadow removal methods are carried out on the basis of a color image or grayscale image, for example, an intelligent edge matching method, a texture-based method, or a color-and-texture-based method. However, these kinds of methods may be dramatically influenced by environmental background complexity, and may be easily influenced by lighting conditions.

In U.S. Pat. No. 8,294,794 B2, a shadow removal method used for a vehicle-mounted camera is disclosed. In this method, an edge of an input image is recognized, and at same time, a corresponding edge of a corresponding illumination-invariant image is recognized. By respectively determining the existence states of the two edges in the two images, it is determined whether shadow exists. This method is mainly based on an edge detection technique. In this method, an input image and its corresponding illumination-invariant image are utilized at the same time for detecting edges, respectively. On the basis of the difference between the detected edges, it is determined whether shadow exits. However, in this method, it is necessary to obtain the corresponding illumination-invariant image, and the removal of shadow is restricted by the obtention of the corresponding illumination-invariant image and the quality of the corresponding illumination-invariant image.

In U.S. Pat. No. 7,133,083 B2, a dynamic shadow removal method is disclosed in which at least one camera, one projector, and one screen are utilized. A spatial relationship among the camera, the projector, and the screen is calculated, and then by calculating the difference between a projected image and an image captured by the camera, it is determined whether shadow exists. In this method, it is necessary to use at least one camera, one projector, and one screen, and it is also necessary to build the spatial relationship among the camera, the projector, and the screen. The main idea of this method is building a predicted image according to projected contents, then comparing the predicted image and an actually-captured image, and then, on the basis of the difference of the two images, determining whether shadow exists. However, in this method, it is necessary to know the projected contents in advance. Furthermore, the application of this method is very limited; for example, this method is only suitable to be used in shadow detection of a projection exhibition system.

Moreover, in a doctoral thesis entitled "Detection, Tracking, and Identification of People using Stereo Vision" written by Yong Zhao of Brown University, a shadow removal method using background models on the basis of a depth map is disclosed. In this method, two background models are used, namely, a depth background model on the basis of a depth map as well as an appearance background model on the basis of a RGB/grayscale image. First, on the basis of the appearance background model, appearance foreground is detected which probably includes shadow. Second, it is determined whether the appearance foreground overlaps with the depth background model. If the appearance foreground overlaps with the depth background model, then that means the overlapped part is shadow. The main idea of this method is that shadow cannot change the depth of background. However, this method relies on the quality of the two background models too much, and it is difficult to acquire a dense depth background model by utilizing a well-used two-lens camera. As a result, this method is not valid in some cases.

SUMMARY OF THE INVENTION

In general, in a real 3-dimensional coordinate system, an object is a 3-dimensional one, for example, a person, a vehicle, or an animal, and shadow usually is a projection of the object, for example, a projection onto the ground surface, a wall surface, or a table surface. For this reason, shadow mostly dovetails with a plane characteristic in a 3-dimensional space. As a result, in the present invention, a shadow detection method is proposed which detects shadow on the basis of a plane characteristic of the shadow in a 3-dimensional space.

According to one aspect of the present invention, a shadow detection method is provided. The method includes a step of obtaining a depth/disparity map and color/grayscale image from a two-lens camera or a stereo camera; a step of detecting and acquiring plural foreground points; a step of projecting the acquired plural foreground points into a 3-dimensional coordinate system; a step of performing, in the 3-dimensional coordinate system, a clustering process on the projected plural foreground points so as to divide the projected plural foreground points into one or more point clouds; a step of calculating density distribution of each of the one or more point clouds by utilizing a principal component analysis algorithm so as to obtain one or more principal component values of the corresponding point cloud; and a step of determining, based on the one and more principal component values of the corresponding point cloud, whether the corresponding point cloud is a shadow.

In the shadow detection method, the step of determining, based on the principal component values of the corresponding point cloud, whether the corresponding point cloud is a shadow includes a step of, if one principal component value of the one or more corresponding point clouds approaches zero, then determining the corresponding point cloud as the shadow.

In the shadow detection method, the step of detecting and acquiring plural foreground points includes a step of performing background modelling so as to generate a background model based on the color/grayscale image or the depth/disparity map; and a step of extracting, based on the generated background model, the plural foreground points.

In the shadow detection method, the step of projecting the acquired plural foreground points into a 3-dimensional coordinate system includes a step of projecting, based on a relationship between an image coordinate system of the two-lens camera or stereo camera and a video camera coordinate system, the extracted plural foreground points into the video camera coordinate system.

In the shadow detection method, the step of performing, in the 3-dimensional coordinate system, clustering on the projected plural foreground points so as to divide the projected plural foreground points into one or more point clouds is achieved by performing clustering on 3-dimensional information of the projected plural foreground points by adopting a K-Nearest Neighbors algorithm or K-Means algorithm.

According to another aspect of the present invention, a shadow detection device is provided. The device includes an image obtention part configured to obtain a depth/disparity map and color/grayscale image from a two-lens camera or stereo camera; a foreground detection part configured to detect and acquire plural foreground points; a coordinate conversion part configured to project the acquired plural foreground points into a 3-dimensional coordinate system; a clustering part configured to perform, in the 3-dimensional coordinate system, a clustering process on the projected plural foreground points so as to divide the projected plural foreground points into one or more point clouds; a principal component analysis part configured to calculate density distribution of each of the one or more point clouds by utilizing a principal component analysis algorithm so as to obtain one or more principal component values of the corresponding point cloud; and a determination part configured to determine, based on the one or more principal component values of the corresponding point cloud, whether the corresponding point cloud is a shadow.

According to the shadow detection method described in the embodiments of the present invention, compared to a conventional shadow detection and removal method on the basis of an edge detection technique, the shadow detection method does not utilize the edge detection technique, and does not need to utilize an illumination-invariant image. In other words, in the shadow detection method described in the embodiments of the present invention, plural foreground points are projected into a 3-dimensional coordinate system, and one or more point clouds are obtained by carrying out clustering with respect to the projected plural foreground points. After that, plane characteristic matching is carried out with respect to each of the one or more point clouds. If the result of the plane characteristic matching is okay, then the corresponding point cloud is determined as a shadow and is removed. Compared to a conventional shadow detection and removal method (in which first, a predicted image is created on the basis of contents projected in advance; second, the predicted image and an actually-captured image are compared; finally, on the basis of the difference of the two images, it is determined whether a shadow exists, and if the shadow exists, then the shadow is removed), the shadow detection method described in the embodiments of the present invention utilizes a two-lens camera or stereo camera, and employs a color/grayscale image and depth/disparity map. As a result, the shadow detection method described in the embodiments of the present invention may be used in various applications, and does not need to know the projected contents in advance. Compared to a conventional shadow detection and removal method on the basis of an appearance background model and a depth background model, the shadow detection method described in the embodiments of the present invention carries out shadow detection and removal only on the basis of a physical characteristic (a plane characteristic). As a result, the shadow detection method described in the embodiments of the present invention is more convenient.

In addition, in the shadow detection method described in the embodiments of the present invention is, shadow is detected and removed in a 3-dimensional space on the basis of a plane characteristic of the shadow. As a result, the shadow detection may be used in any application in which a two-lens camera or stereo camera is utilized. Furthermore, the shadow detection method does not have too many requirements for a depth/disparity map input by a two-lens or stereo camera, and is robust to illumination. Moreover, in the shadow detection method, only foreground points are processed. As a result, the speed of the related calculation is fast, and the cost of the related calculation is low.

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 2:
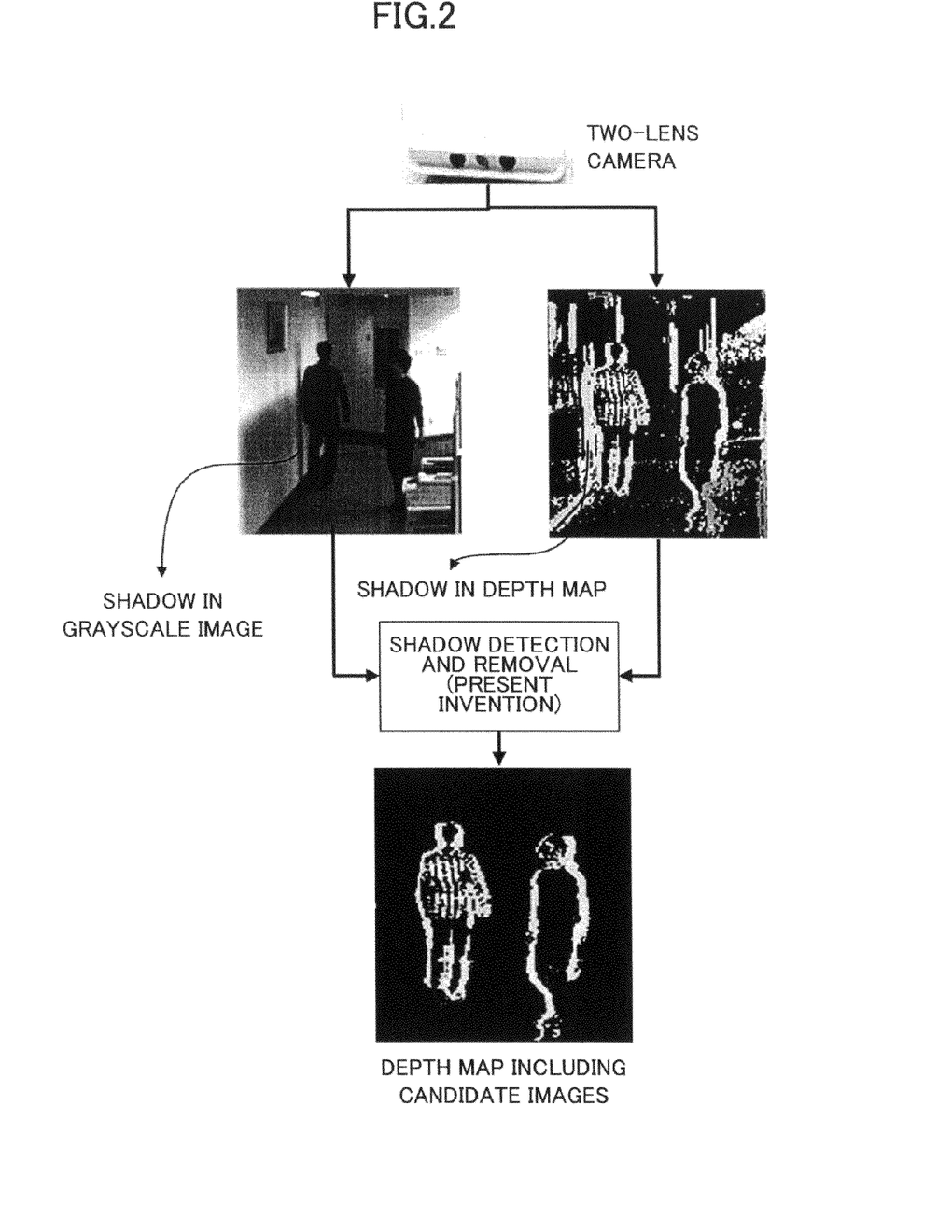
FIG. 2 illustrates a process of shadow detection and removal according to an embodiment of the present invention.

FIG. 2 illustrates a process of shadow detection and removal according to an embodiment of the present invention.

As shown in FIG. 2, first, a color image, a grayscale image, or a depth map of a scene, captured by a two-lens camera is obtained, and second, the obtained one is input to a shadow detection and removal system according to an embodiment of the present invention. After that, in this shadow detection and removal system, a shadow detection and removal method according to an embodiment of the present invention is carried out with respect to the input color image, grayscale image, or depth map so as to obtain an image including only one or more candidate objects. Here it should be noted that in the present invention, what is proposed is a shadow detection and removal process, and the output of this process is one or more candidate objects in a depth map. Furthermore, what FIG. 2 illustrates is just an example. That is to say, in FIG. 2, it is possible to use plural two-lens cameras, or it is possible to adopt one or more stereo cameras. In other words, it is possible to utilize any device as long as it can obtain a color/grayscale image and depth/disparity map.

Figure 3:
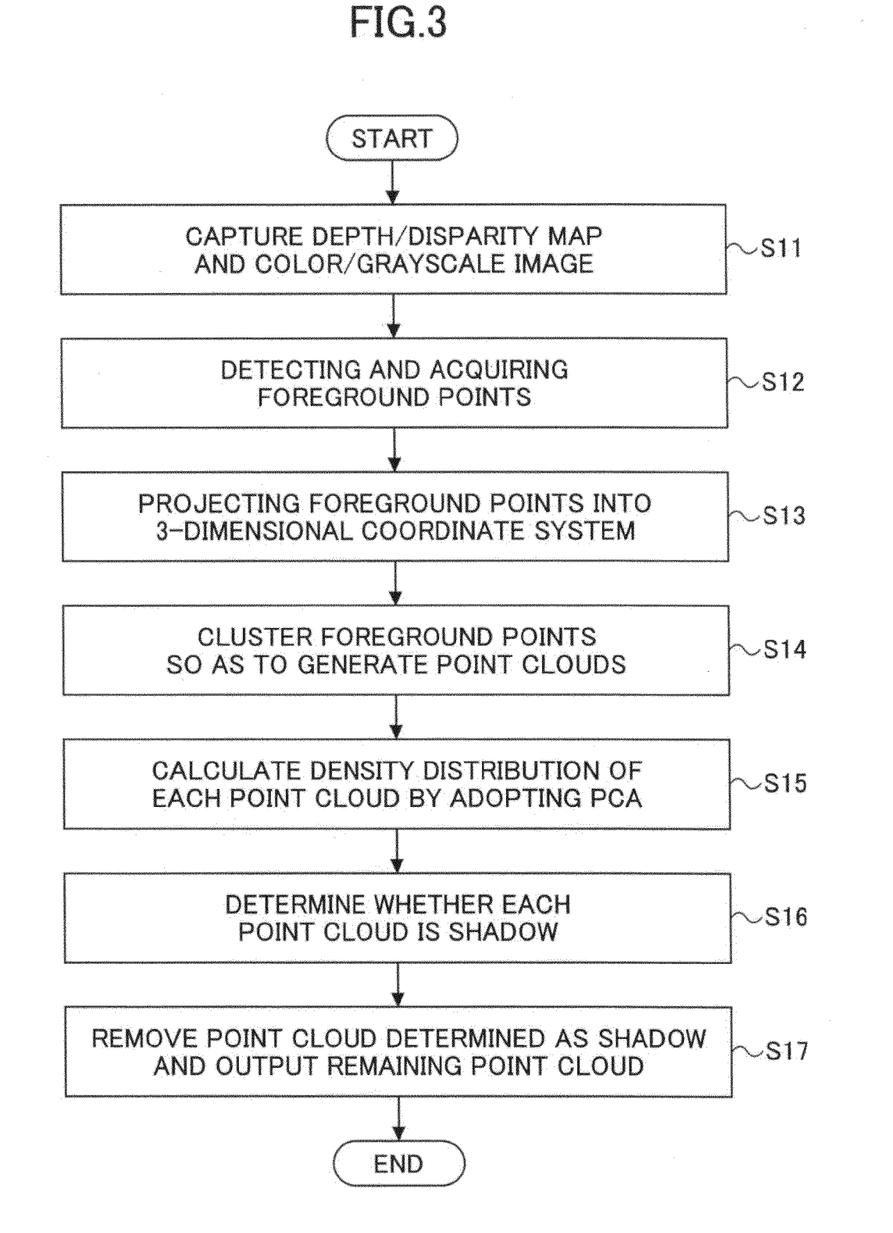
FIG. 3 is a flowchart of shadow detection and removal according to an embodiment of the present invention.

FIG. 3 is a flowchart of shadow detection and removal according to an embodiment of the present invention.

As shown in FIG. 3, first, in STEP S11, a depth/disparity map and color/grayscale image are captured by a two-lens camera or stereo camera, and the captured two are input to an image processing system according to an embodiment of the present invention, i.e., the captured two are input to a foreground detection part described below. Next, in STEP S12, the foreground detection part carries out background modelling on the basis of the depth/disparity map or a RGB/grayscale image so as to obtain a background model. On the basis of the obtained background model, plural foreground points are acquired by carrying out difference calculation (subtraction). Here it should be noted that the background modelling is a kind of well-known technique; as a result, the related description is omitted. The background modelling may employ static background modelling, or may employ dynamic background modelling, for example, using the GMM (Gaussian Mixture Model). By carrying out this kind of difference calculation, it is possible to acquire the plural foreground points. After that, an image formed by the acquired plural foreground points is provided to a coordinate conversion part. In STEP S13, the coordinate conversion part converts the acquired plural foreground points of a 2-dimensional coordinate system into a 3-dimensional video camera coordinate system. Here, it is necessary to utilize the parameters related to a two-lens camera/stereo camera. For example, if a two-lens camera satisfying the right-hand rule is taken as an example, then its conversion equation may be expressed as follows.

$$X_c = (x_1 - c_x) * Z / f_x$$

$$Y_c = (y_1 - c_y) * Z / f_y \quad (1)$$

Here $x_1$ and $y_1$ refer to the coordinate values of a foreground point in an image coordinate system (i.e., a 2-dimensional coordinate system); $c_x$ and $c_y$ refer to the coordinate values of the center of the image coordinate system; Z refers to the depth value of a point corresponding to the foreground point, in a depth map; and $X_c$, $Y_c$ and Z refers to the final 3-dimensional coordinate values ($X_c$, $Y_c$, Z) of the foreground point in a 3-dimensional video camera coordinate system.

On the basis of the above equation (1), all the acquired foreground points in the image coordinate system are converted; that is to say, it is possible to obtain the corresponding foreground points in the 3-dimensional video camera coordinate system. Taking into account that in the real world, these foreground points in the 3-dimensional space should belong to different objects, it is necessary to carry out division with respect to these foreground points later so as to obtain different foreground point clouds.

Figure 4:
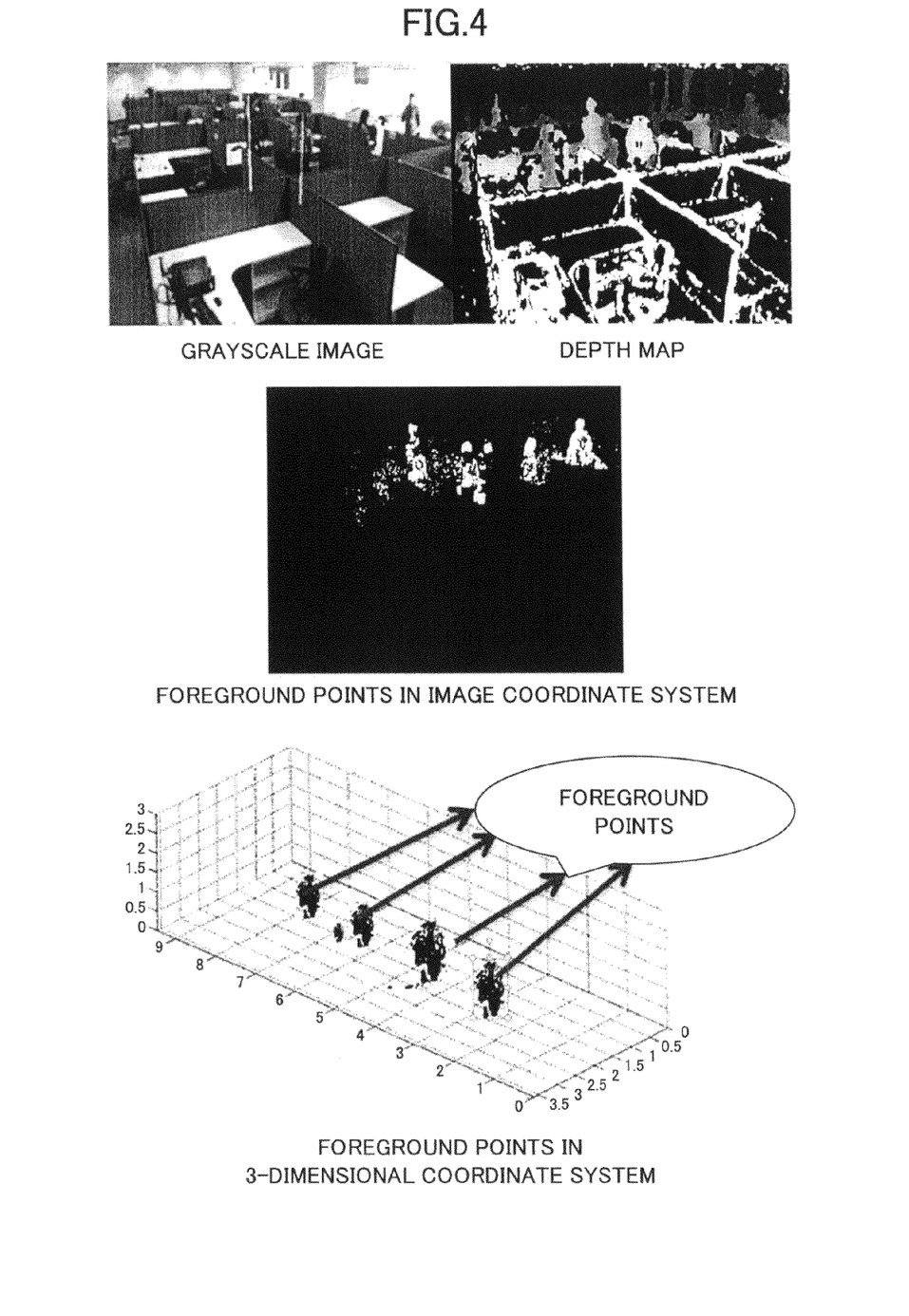
FIG. 4 illustrates an example of acquiring foreground points and converting the acquired foreground points into a 3-dimensional space.

FIG. 4 illustrates an example of acquiring foreground points and converting the acquired foreground points into a 3-dimensional space.

As shown in FIG. 4, it is known that there are four persons in a grayscale image. Similarly, it is also possible to find them in a corresponding depth map. After carrying out background modelling, it is possible to acquire foreground, and to generate a foreground image, i.e., to acquire plural foreground points in an image coordinate system. Finally, all the acquired foreground points are converted into a 3-dimensional video camera coordinate system from a 2-dimensional image coordinate system. A follow-on separation process may be carried out with respect to the foreground points in the 3-dimensional video camera coordinate system, so as to obtain different foreground point clouds.

After the coordinate conversion part carries out the conversion, it provides the coordinates of the obtained foreground points to a clustering part. In STEP S14, the clustering part carries out clustering with respect to all the foreground points, so as to divide these foreground points into different foreground point clouds. The foreground point clouds are also simply called "point clouds". It is possible to adopt, for example, the K-Nearest Neighbors (KNN) algorithm and K-means algorithm so as to divide the 3-dimensional foreground point clouds into different foreground point clouds. The KNN algorithm is also called a K-Nearest Neighbors (KNN) classification algorithm. The KNN algorithm is a mature algorithm, and is also one of the simplest machine learning algorithms. Here it should be noted that since the KNN algorithm and K-means algorithm are well-known techniques, the related descriptions are omitted. For more information about them, for example, it is possible to access the following links, namely, http://en.wikipedia.org/wiki/K-nearest_neighbor_algorithm and http://en.wikipedia.org/wiki/K-means_clustering.

Figure 5:
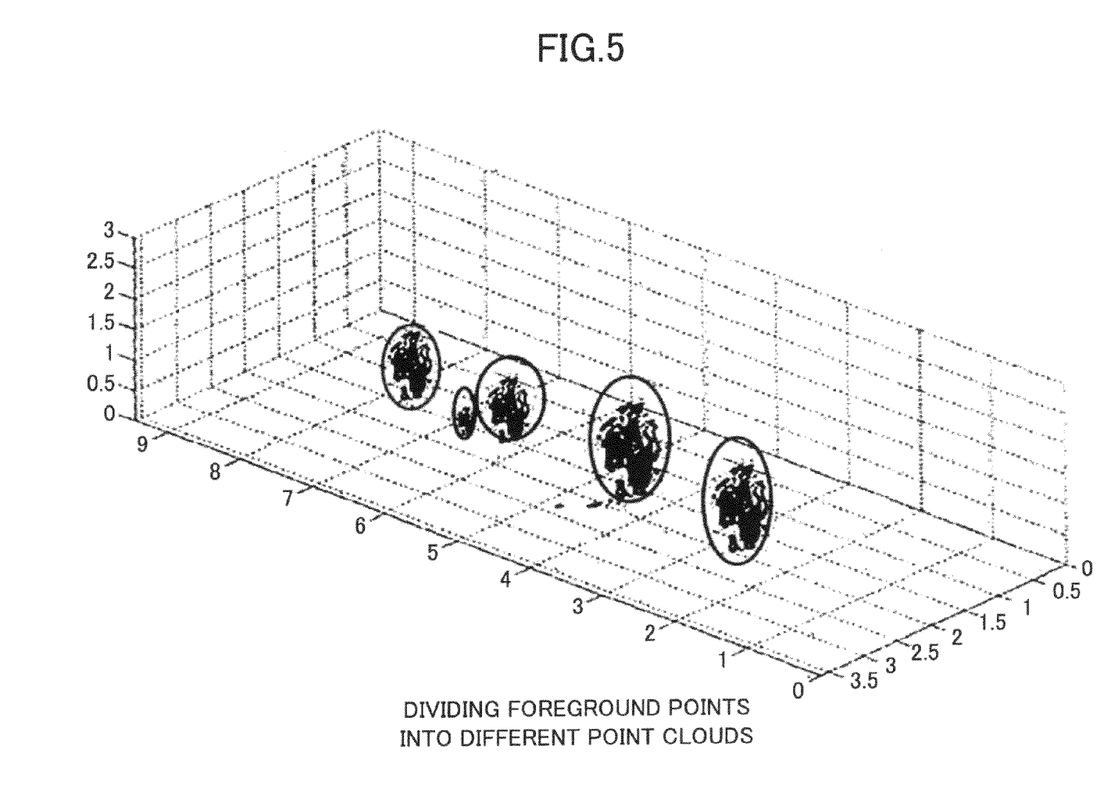
FIG. 5 illustrates an example of dividing foreground points in a 3-dimensional space into different foreground point clouds.

FIG. 5 illustrates an example of dividing foreground points in a 3-dimensional space into different point clouds.

After the clustering part carries out clustering with respect to the plural foreground points so as to divide the plural foreground points into different foreground point clouds, an index number is given to each foreground point cloud, and each foreground point cloud with its index number is provided to a principal component analysis part. In STEP S15, the principal component analysis part carries out principal component analysis (PCA) with respect to each foreground point cloud, so as to obtain principal component values of the corresponding foreground point cloud. In this way, it is possible to obtain the density distribution of each 3-dimensional foreground point cloud. The principal component analysis may recognize the changes of data and the principal direction of distribution. Here it should be noted that since the principal component analysis is a well-known technique, the related description is omitted. For more information about that, for example, it is possible to access the following link, namely, http://en.wikipedia.org/wiki/Principal_component_analysis.

Figure 6:
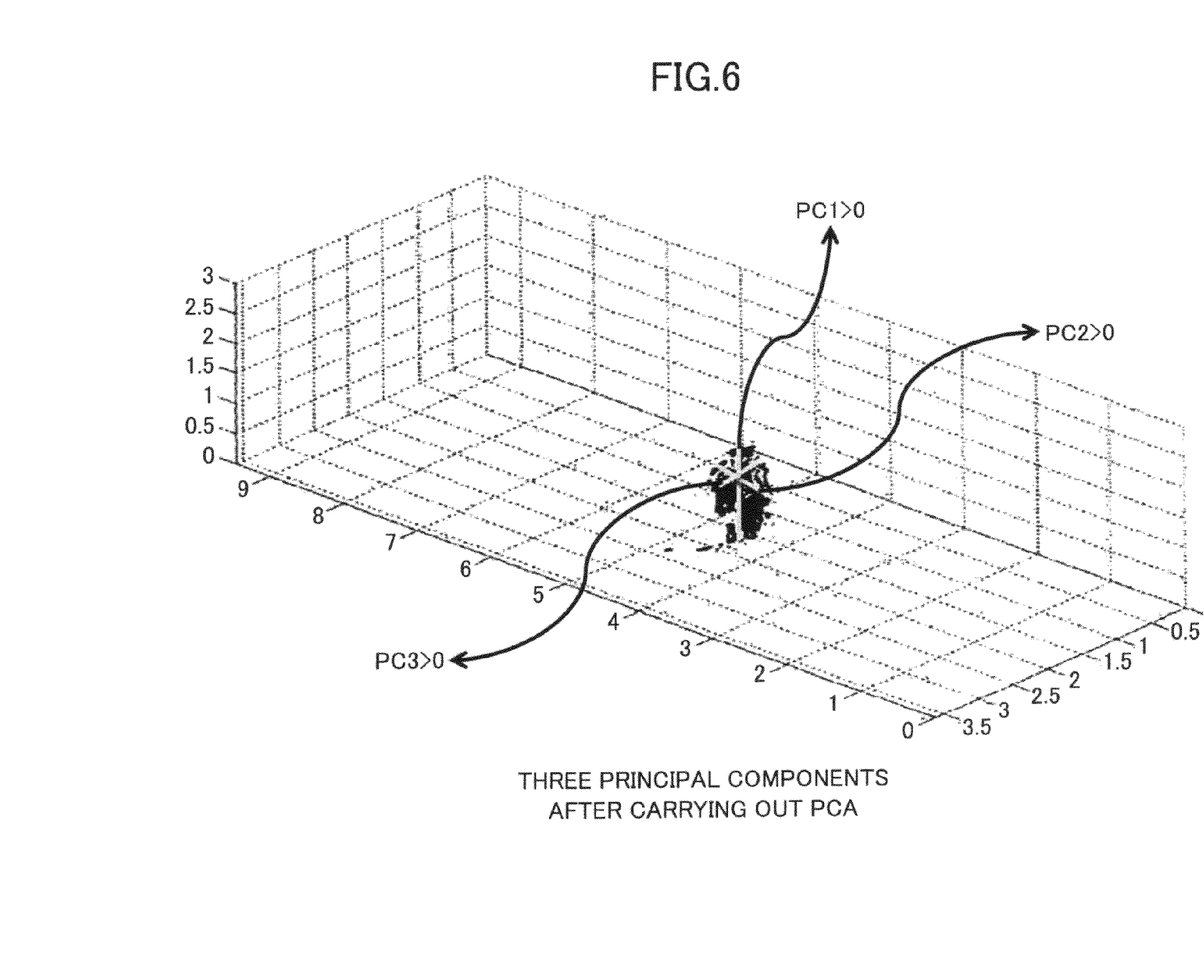
FIG. 6 illustrates an example of obtaining three first principal components by performing PCA (principal component analysis) on each point cloud in a 3-dimensional space.

FIG. 6 illustrates an example of obtaining three first principal components by performing the PCA on each foreground point cloud in a 3-dimensional space.

As shown FIG. 6, after the PCA is carried out with respect to a foreground point cloud in a 3-dimensional space, three width values PC1, PC2, and PC3 of three principal components are obtained, respectively. All the width values of these three principal components are greater than 0 (not approaching zero).

Figure 7:
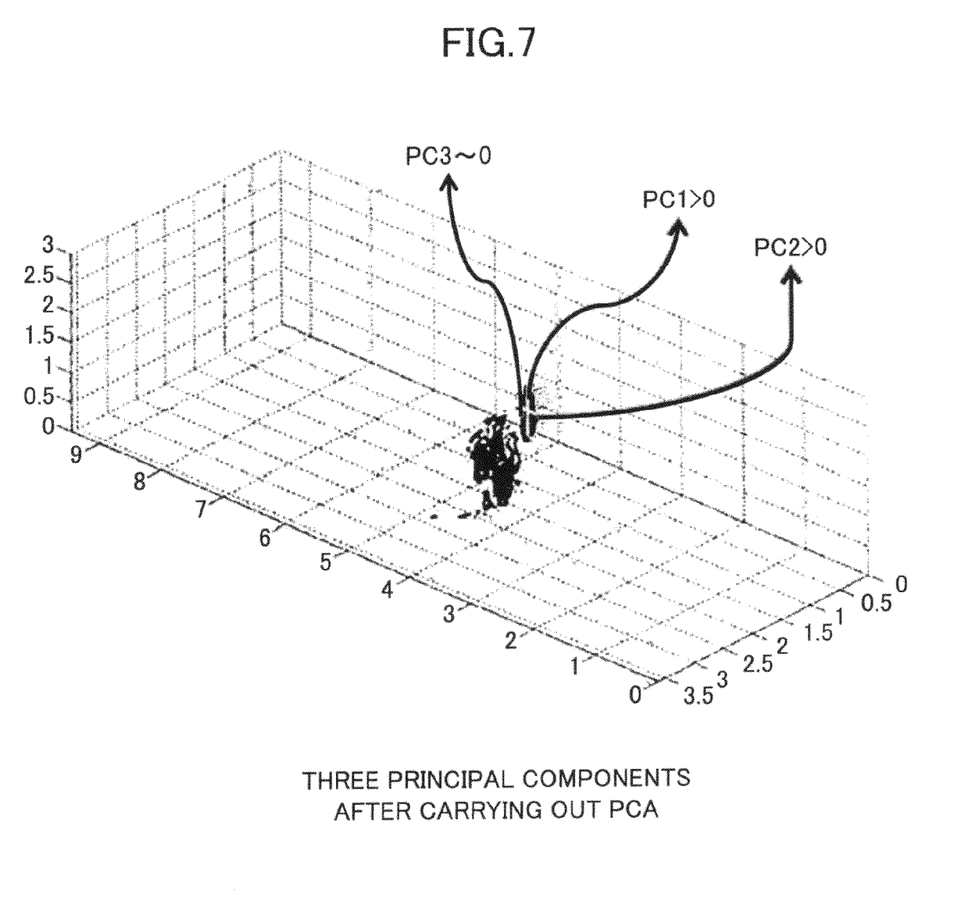
FIG. 7 illustrates an example of obtaining three second principal components by performing PCA on each point cloud in a 3-dimensional space.

FIG. 7 illustrates an example of obtaining three second principal components by performing the PCA on each point cloud in a 3-dimensional space.

As shown in FIG. 7, after the PCA is carried out with respect to a person's shadow generated on a wall surface in a 3-dimensional space, three principal components are obtained. After that, three width values PC1, PC2, and PC3 of these three principal components are obtained, respectively. Among these three width values of these three principal components, PC1 and PC2 are greater than 0 (not approaching zero), and PC3 approaches 0.

Figure 8:
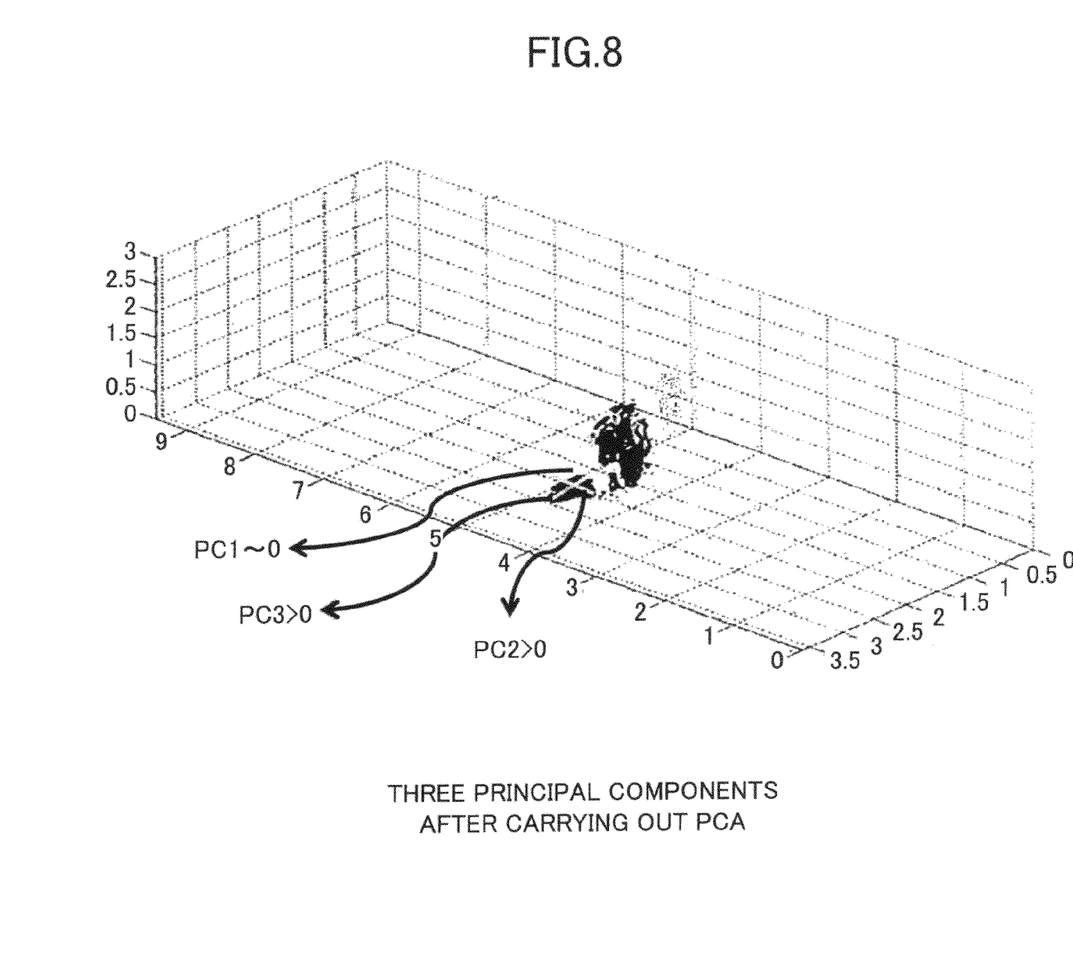
FIG. 8 illustrates an example of obtaining three third principal components by performing PCA on each point cloud in a 3-dimensional space.

FIG. 8 illustrates an example of obtaining three third principal components by performing the PCA on each point cloud in a 3-dimensional space.

As shown in FIG. 8, after the PCA is carried out with respect to a person's shadow on the ground surface in a 3-dimensional space, three principal components are obtained. After that, three width values PC1, PC2, and PC3 of these three principal components are obtained, respectively. Among these three width values of these three principal components, PC2 and PC3 are greater than 0 (not approaching zero), and PC1 approaches zero.

After the principal component analysis part carries out the principal component analysis with respect to each point cloud, the obtained principal component values of the corresponding point cloud are provided to a determination part. In STEP S16, the determination part determines, on the basis of a plane characteristic of shadow, whether each point cloud is a shadow. In general, a shadow projected into a 3-dimensional space approaches a plane in most cases. As for a plane, after the PCA is carried out with respect to a point cloud corresponding to the plane which is included in an image, among the obtained three principal components, one is far less than the others, and the smallest one approaches 0. This is the so-called plane characteristic. As a result, on the basis of this kind of plane characteristic of shadow, it is possible to determine whether each point cloud belongs to a plane, i.e., whether each point cloud belongs to a shadow. In particular, as for each point cloud, among its three principal components, if the width of one is far less than those of the others and approaches 0, then it may be determined that the corresponding point cloud is a shadow; otherwise, it may be determined that the corresponding point clouds is a candidate object. As shown in FIG. 6, all the obtained three width values PC1, PC2 and PC3 of those three principal components are greater than 0. As a result, the point cloud shown in FIG. 6 is not a shadow, but is a kind of detected object in an image. Furthermore, as shown in FIGS. 7 and 8, among the obtained width values PC1, PC2, and PC3 of those three principal components, PC1 and PC2 are greater than 0 (not approaching zero) and PC3 approaches 0 (in a case of FIG. 7), or PC2 and PC3 are greater than 0 (not approaching zero) and PC1 approaches 0 (in a case of FIG. 8). As a result, the point clouds shown in FIGS. 7 and 8 are determined as shadows.

After carrying out the shadow determination, in STEP S17, each foreground point cloud determined as a shadow is removed from the foreground point image, and the remaining foreground point clouds are output as candidate objects. These kinds of output candidate objects may be used in follow-on objection detection, object tracking, object recognition and so on.

Figure 9:
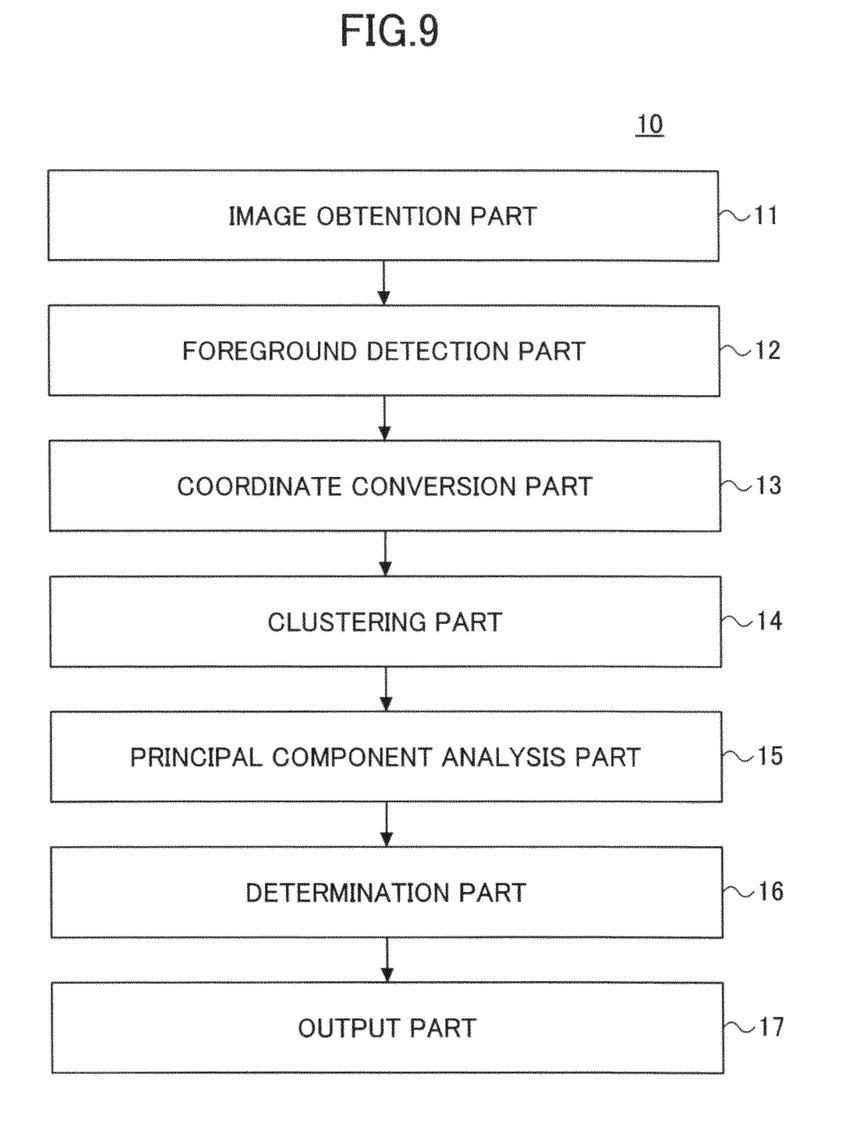
FIG. 9 is block diagram of a shadow detection and removal system according to an embodiment of the present invention.

FIG. 9 is block diagram of a shadow detection and removal system according to an embodiment of the present invention.

As shown in FIG. 9, a shadow detection and removal system 10 includes an image obtention part 11 configured to obtain a depth/disparity map and color/grayscale image; a foreground detection part 12 configured to detect and acquire plural foreground points; a coordinate conversion part 13 configured to project the acquired plural foreground points into a 3-dimensional coordinate system; a clustering part 14 configured to divide, in the 3-dimensional coordinate system, the projected plural foreground points into different point clouds by carrying out clustering with respect to the projected plural foreground points; a principal component analysis part 15 configured to calculate density distribution of each point cloud by carrying out principal component analysis with respect to each point cloud so as to obtain principal component values; a determination part 16 configured to determine, on the basis of the principal component values, whether the corresponding point cloud is a shadow; and an output part 17 configured to output one or more candidate objects.

In addition, the present invention also relates to a shadow detection device including the image obtention part 11, the foreground detection part 12, the coordinate conversion part 13, the clustering part 14, the principal component analysis part 15, and the determination part 16.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201310178434.6 filed on May 15, 2013, the entire contents of which are hereby incorporated by reference.

What is claimed is:

1. A shadow detection method comprising:
a step of obtaining a depth/disparity map and color/grayscale image from a two-lens camera or stereo camera;
a step of detecting and acquiring plural foreground points;
a step of projecting the acquired plural foreground points into a 3-dimensional coordinate system;
a step of carrying out, in the 3-dimensional coordinate system, a clustering process with respect to the projected plural foreground points so as to divide the projected plural foreground points into one or more point clouds;

a step of calculating density distribution of each of the one or more point clouds by adopting a principal component analysis algorithm so as to obtain one or more principal component values of the corresponding point cloud; and a step of determining, based on the one or more principal component values, whether the corresponding point cloud is a shadow.

2. The shadow detection method according to claim 1, wherein, the step of determining, based on the one or more principal component values, whether the corresponding point cloud is a shadow comprises:

a step of, if one principal component value of the corresponding point cloud approaches zero, then determining the corresponding point cloud as the shadow.

3. The shadow detection method according to claim 2, wherein, the step of detecting and acquiring plural foreground points comprises:

a step of carrying out background modelling based on the color/grayscale or depth/disparity map so as to obtain a background model; and a step of extracting the plural foreground points based on the obtained background model.

4. The shadow detection method according to claim 3, wherein, the step of projecting the acquired plural foreground points into a 3-dimensional coordinate system comprises:

a step of projecting the extracted plural foreground points into a video camera coordinate system based on a relationship between a two-lens/stereo camera image coordinate system and the video camera coordinate system.

5. The shadow detection method according to claim 4, wherein, the step of carrying out, in the 3-dimensional coordinate system, a clustering process with respect to the projected plural foreground points so as to divide the projected plural foreground points into one or more point clouds comprises:

a step of carrying out a K-Nearest Neighbors algorithm or K-Means algorithm with respect to 3-dimensional coordinate information of the projected plural foreground points.

6. A shadow detection device comprising:

an image obtention part configured to obtain a depth/disparity map and color/grayscale image from a two-lens camera or stereo camera;

a foreground detection part configured to detect and acquire plural foreground points;

a coordinate conversion part configured to project the acquired plural foreground points into a 3-dimensional coordinate system;

a clustering part configured to carry out, in the 3-dimensional coordinates system, a clustering process with respect to the projected plural foreground points so as to divide the projected plural foreground points into one or more point clouds;

a principal component analysis part configured to calculate density distribution of each of the one or more point clouds by utilizing a principal component analysis algorithm so as to obtain one or more principal component values of the corresponding point cloud; and a determination part configured to determine, based on the one or more principal component values of the corresponding point cloud, whether the corresponding point cloud is a shadow.

7. The shadow detection device according to claim 6, wherein, the determination part carries out:

a step of, if one principal component value of the corresponding point cloud approaches zero, then determining the corresponding point cloud as the shadow.

8. The shadow detection device according to claim 7, wherein, the foreground detection part carries out:

a step of carrying out background modelling based on the color/grayscale or depth/disparity map so as to obtain a background model; and a step of extracting the plural foreground points based on the obtained background model.

9. The shadow detection device according to claim 8, wherein, the coordinate conversion part carries out:

a step of projecting the extracted plural foreground points into a video camera coordinate system based on a relationship between a two-lens/stereo camera image coordinate system and the video camera coordinate system.

10. The shadow detection device according to claim 9, wherein, the clustering part carries out:

a step of carrying out a K-Nearest Neighbors algorithm or K-Means algorithm with respect to 3-dimensional coordinate information of the projected plural foreground points.

* * * * *